(12) United States Patent
Kurata et al.

(10) Patent No.: US 7,628,010 B2
(45) Date of Patent: Dec. 8, 2009

(54) EXHAUST PURIFICATION SYSTEM

(75) Inventors: Kazuo Kurata, Okazaki (JP); Kei Shigahara, Anjyo (JP)

(73) Assignee: Mitsubishi Jidosha Kogyo Kabushiki Kaisha, Tokyo (JP)

(*) Notice: Subject to any disclaimer, the term of this patent is extended or adjusted under 35 U.S.C. 154(b) by 302 days.

(21) Appl. No.: 11/521,446

(22) Filed: Sep. 15, 2006

(65) Prior Publication Data

US 2007/0068148 A1    Mar. 29, 2007

(30) Foreign Application Priority Data

Sep. 28, 2005    (JP) .............................. 2005-282148

(51) Int. Cl.
*F01N 3/025* (2006.01)
*F01N 3/035* (2006.01)

(52) U.S. Cl. .............................. 60/286; 60/295; 60/297

(58) Field of Classification Search .................. 60/285, 60/286, 295, 297, 303
See application file for complete search history.

(56) References Cited

U.S. PATENT DOCUMENTS

| | | | | |
|---|---|---|---|---|
| 5,606,855 | A * | 3/1997 | Tomisawa | 60/274 |
| 6,295,806 | B1 * | 10/2001 | Poublon et al. | 60/274 |
| 7,152,392 | B2 * | 12/2006 | Kuboshima et al. | 60/277 |
| 2004/0074225 | A1 * | 4/2004 | Schaller et al. | 60/274 |
| 2005/0143899 | A1 * | 6/2005 | Ueno et al. | 701/108 |
| 2006/0026950 | A1 * | 2/2006 | Kondou et al. | 60/297 |

FOREIGN PATENT DOCUMENTS

| | | |
|---|---|---|
| EP | 1 234 959 A2 | 8/2002 |
| EP | 1 555 401 A1 | 7/2005 |
| JP | 9-195754 A | 7/1997 |
| JP | 11-101122 A | 4/1999 |
| JP | 2003-13730 A | 1/2003 |
| JP | 2003-83033 A | 3/2003 |
| JP | 2005-180322 A | 7/2005 |
| WO | WO 2005124118 A1 * | 12/2005 |

* cited by examiner

*Primary Examiner*—Thomas E Denion
*Assistant Examiner*—Jonathan Matthias
(74) *Attorney, Agent, or Firm*—Birch, Stewart, Kolasch & Birch, LLP (57) ABSTRACT

An exhaust purification system includes an oxidation catalyst disposed in an exhaust passageway of an engine, and a filter disposed downstream of the oxidation catalyst in the exhaust passageway. The exhaust purification system further includes an outlet temperature setting section for setting, as an outlet target temperature, a target value for an exhaust temperature which is detected on the downstream side of the filter in the exhaust passageway. The system further includes a heat loss quantity computing section for computing a heat loss quantity radiated from the filter to outside the exhaust passageway when exhaust discharged from the engine passes through the filter; and an inlet temperature setting section for setting, as an inlet target temperature on an upstream side of the filter, a temperature obtained by adding a loss temperature reduced by the heat loss quantity to the outlet target temperature.

8 Claims, 6 Drawing Sheets

EXHAUST PURIFICATION SYSTEM

CROSS-REFERENCE TO THE RELATED APPLICATION

This application incorporates by reference the subject matter of Application No. 2005-282148 filed in Japan on Sep. 28, 2005 on which a priority claim is based under 35 U.S.C. § 119(a).

BACKGROUND OF THE INVENTION (1) Field of the Invention

The present invention relates to an exhaust purification system that is suited to purify engine exhaust, particularly diesel engine exhaust.

(2) Description of the Related Art

Heretofore, as a postprocessing system for a diesel engine which is installed in a vehicle, there has been developed an exhaust purification system that includes a diesel particulate filter (DPF) (hereinafter referred to simply as a filter) for collecting particulate matter (hereinafter referred to as PM) contained in exhaust gas, and an oxidation catalyst for oxidizing and removing the PM on the filter. This exhaust purification system generates nitrogen dioxide ($NO_2$) from nitrogen oxide (NO) contained in exhaust gas using the oxidation catalyst, and also continuously burns and removes PM by reacting $NO_2$ with PM collected on the filter, thereby regenerating the filter. Note that such a type for burning and removing PM continuously is called a continuous regeneration type (e.g., see Japanese patent laid-open publication No. 2003-13730).

On the other hand, under the Japanese driving condition in which there are many traffic jams (e.g., vehicles are traveling with engines revolving at low load and low speed), the exhaust gas temperature is less liable to rise, so the temperature of the filter is less liable to reach a temperature required for combustion of PM. That is, there is a possibility that the PM on the filter will not be sufficiently burned and removed.

For this reason, there has also been developed an exhaust purification system of forced regeneration type which performs combustion of PM forcibly by maintaining the filter temperature at the required temperature intentionally. As the forced regeneration type exhaust purification system, many kinds of system have been developed to increase a filter temperature by providing an external heat source such as a heater in the filter or by raising an exhaust gas temperature.

In addition, there has been developed a system of supplying unburned fuel (HC) to an oxidation catalyst provided in the stage before the filter (upstream of the exhaust passage), and raising the temperature of the filter by heat produced by an oxidative reaction. Since heat generated by unburned fuel can be utilized directly to the temperature rise of the filter, this system can obtain satisfactory thermal efficiency and is expected as a system capable of suppressing the worsening of fuel consumption.

Figure 7:
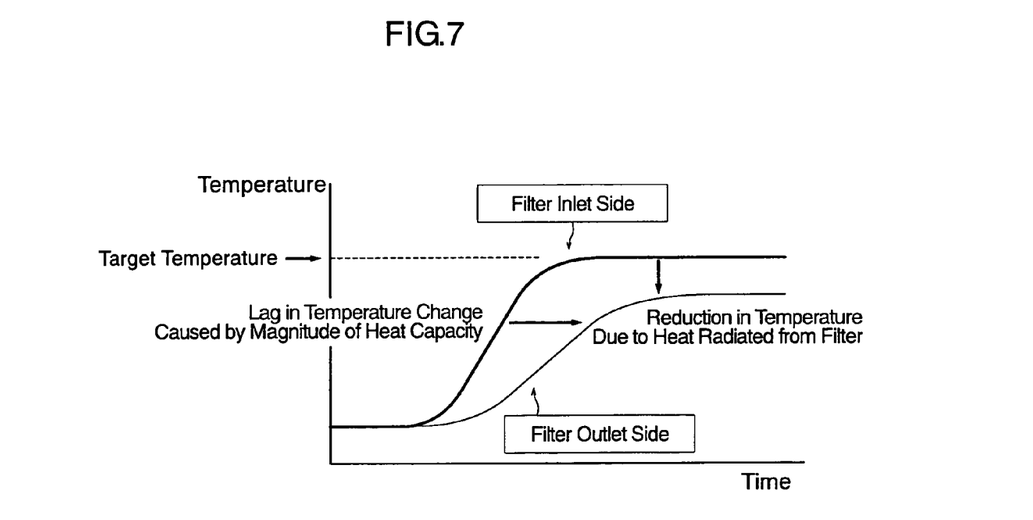
FIG. 7 is a graph showing changes in the inlet and outlet temperatures of the filter of a conventional exhaust purification system.

However, in the case of the system which gives heat to the filter from the upstream side of the filter to raise the filter temperature, it is conceivable that because of the radiation of heat from the filter to outside the exhaust passage, a rise in temperature will become slow on the downstream side of the filter. For example, as shown in FIG. 7, in the case where the inlet temperature of the filter is controlled so that it becomes the target temperature required to burn PM, there is a possibility that the outlet temperature of the filter will not reach the target temperature, and consequently, there is a fear of the PM within the filter not being sufficiently burned.

Particularly, since exhaust gas is slight in quantity during idle where the engine is running at relatively low revolutions, heat quantity radiated from the filter to the outside air increases compared with heat quantity of oxidation given by unburned fuel, so there is a large difference in temperature between the inlet side and outlet side of the filter. Therefore, under the driving condition in which exhaust gas is slight in quantity, there is a problem that a part difficult to regenerate may occur within the filter, particularly the outlet side.

In addition, because the heat capacity of the filter is generally large, a difference in temperature rise speed occurs between the inlet side and outlet side of the filter disposed in the exhaust line. For that reason, even if feedback control of the outlet temperature of the filter is performed, satisfactory response is difficult to obtain, and there is another problem that because of an excess rise in the inlet temperature of the filter, melt damage will occur easily.

SUMMARY OF THE INVENTION

The present invention has been made in view of the problems described above. Accordingly, it is the primary object of the present invention to provide an exhaust purification system that is capable of efficiently regenerating the entirety of a diesel particulate filter while preventing melt damage to the filter due to an excess rise in temperature.

(1) To achieve the above object, there is provided an exhaust purification system comprising an oxidation catalyst disposed in an exhaust passageway of an engine, and a filter disposed downstream of the oxidation catalyst in the exhaust passageway. The exhaust purification system of the present invention further comprises three components: outlet temperature setting device for setting, as an outlet target temperature, a target value for an exhaust temperature which is detected on a downstream side of the filter in the exhaust passageway; heat loss quantity computing device for computing a heat loss quantity radiated from the filter to outside the exhaust passageway when exhaust discharged from the engine passes through the filter; and inlet temperature setting device for setting, as an inlet target temperature on an upstream side of the filter, a temperature obtained by adding a loss temperature reduced by the heat loss quantity to the outlet target temperature.

In this case, the outlet target temperature is preferably set to a temperature at which particulate matter (PM) can be burned sufficiently at the outlet side of the filter, in a range where there is no melt damage to the filter. It is also preferable that the outlet target temperature be set as low as possible under the above-described condition.

According to such a construction, it becomes possible to accurately set the upstream side temperature of the filter so that the surface temperature of the filter outlet side becomes the outlet target temperature. Therefore, the exhaust purification system of the present invention is capable of realizing sufficient regeneration in which there is no unburned PM between the upstream side and downstream side of the filter. In addition, since there is no unburned PM, an excess rise in temperature can be suppressed during the next forced regeneration, whereby melt damage to the filter can be prevented.

(2) Preferably, the exhaust purification system of the present invention further comprises fuel quantity adjusting device for adjusting a supply quantity of unburned fuel that is supplied to the oxidation catalyst so that an exhaust temperature on the upstream side of the filter becomes the inlet target temperature.

According to such a construction, the upstream side temperature of the filter can be increased or reduced with a simple structure which adjusts only a fuel injection quantity.

(3) Preferably, the exhaust purification system of the present invention further comprises inlet temperature detecting device for detecting an exhaust temperature on an inlet side of the filter in the exhaust passageway. In this case, the fuel quantity adjusting device adjusts the supply quantity of unburned fuel by feedback control that is based on the exhaust temperature on an inlet side detected by the inlet temperature detecting device.

According to such a construction, the inlet side temperature of the filter can be raised to the inlet target temperature in a short time and accurately.

(4) The fuel quantity adjusting device preferably stops supply of the unburned fuel when a predetermined period of time has passed since an entire temperature of the filter was equal to or higher than the outlet target temperature.

According to such a construction, an end judgment of control is made based on the lapse of time in the combustion state in which the overall temperature of the filter is at least equal to or higher than the outlet target temperature so that sufficient combustion efficiency is assured. Therefore, unburned PM can be prevented from remaining on the filter, whereby the filter can be completely regenerated.

(5) Preferably, the exhaust purification system of the present invention further comprises outlet temperature detecting device for detecting an exhaust temperature on an outlet side of the filter in the exhaust passageway. In this case, the fuel quantity adjusting device stops supply of the unburned fuel when a predetermined period of time (second predetermined period of time) has passed since the exhaust temperature on the outlet side detected by the outlet temperature detecting device became equal to the outlet target temperature (or exceeded the outlet target temperature).

In other words, when a predetermined period of time has passed since the downstream side temperature of the filter became equal to the outlet target temperature, the fuel quantity adjusting device judges that combustion and purification of PM on the filter has ended, and finishes regeneration control of the filter. That is, at the time that the downstream side temperature of the filter has become equal to the outlet target temperature (or has exceeded the outlet target temperature), the effect of regeneration on the entire filter can be considered to be guaranteed regardless of the inlet and outlet sides. Therefore, counting of time is started at the time this regeneration effect has been guaranteed, and the end timing for regeneration control is determined.

According to such a construction, by referring to the lapse of time from the time at which regeneration is efficiently performed, the timing at which the filter is regenerated can be completely grasped, whereby regeneration time can be shortened. This makes it possible to improve vehicle's fuel consumption.

(6) Preferably, the exhaust purification system of the present invention further comprises outside air temperature detecting device for detecting a temperature outside the exhaust passageway as an outside air temperature; exhaust flow quantity computing device for detecting or computing a flow quantity of the exhaust discharged from the engine; and vehicle speed detecting device for detecting a travel speed of the vehicle. In this case, the heat loss quantity computing device preferably computes the heat loss quantity based on the outside air temperature, the exhaust flow quantity, and the travel speed.

According to such a construction, the heat loss quantity can be strictly grasped by arithmetic operations based on temperature transfer, whereby the inlet side temperature of the filter can be accurately obtained so that the outlet side temperature of the filter becomes the outlet target temperature.

(7) Preferably, the exhaust purification system of the present invention further comprises five components: outside air temperature detecting device for detecting a temperature outside the exhaust passageway as an outside air temperature; exhaust flow quantity computing device for detecting or computing a flow quantity of the exhaust discharged from the engine; vehicle speed detecting device for detecting a travel speed of the vehicle; catalytic temperature detecting device for detecting a temperature of the oxidation catalyst; and catalyst inlet temperature detecting device for detecting, as a catalyst inlet exhaust temperature, a temperature before it flows into the oxidation catalyst. In this case, the fuel quantity adjusting device preferably has four arithmetic devices: gas temperature rise arithmetic device for calculating a first unburned fuel quantity required to raise the exhaust on the upstream side of the filter up to the inlet target temperature, based on a specific heat of the exhaust discharged from the engine, the exhaust flow quantity, the inlet target temperature, and the catalyst inlet exhaust temperature; catalyst temperature rise arithmetic device for calculating a second unburned fuel quantity required to raise the oxidation catalyst up to the inlet target temperature, based on a specific heat of the oxidation catalyst, the inlet target temperature, and the oxidation catalyst temperature; heat radiation quantity arithmetic device for calculating a third unburned fuel quantity equivalent to a heat quantity radiated from the oxidation catalyst to outside the exhaust passageway, based on a heat transfer rate from the oxidation catalyst to outside the exhaust passageway, the oxidation catalyst temperature, the outside air temperature, and the travel speed; and total unburned fuel quantity arithmetic device for summing the first unburned fuel quantity, the second unburned fuel quantity, and the third unburned fuel quantity to calculate a total unburned fuel quantity, and adjusting the supply quantity of unburned fuel supplied to the oxidation catalyst to the total unburned fuel quantity.

According to such a construction, the transfer of a heat quantity between the exhaust, the oxidation catalyst, and the outside air can be accurately grasped, whereby the unburned fuel quantity required to obtain the inlet target temperature can be accurately computed. That is, regeneration control for the filter can be accurately carried out, even in a state where arithmetic conditions are different like the outside air temperature, the temperature of the oxidation catalyst, the travel state of the vehicle, etc., or even in a transient state where arithmetic conditions vary with disturbance (noise) such as acceleration and deceleration.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

An embodiment of the present invention will hereinafter be described with reference to the drawings.

[Configuration]

(1) Overall Configuration

Figure 1:
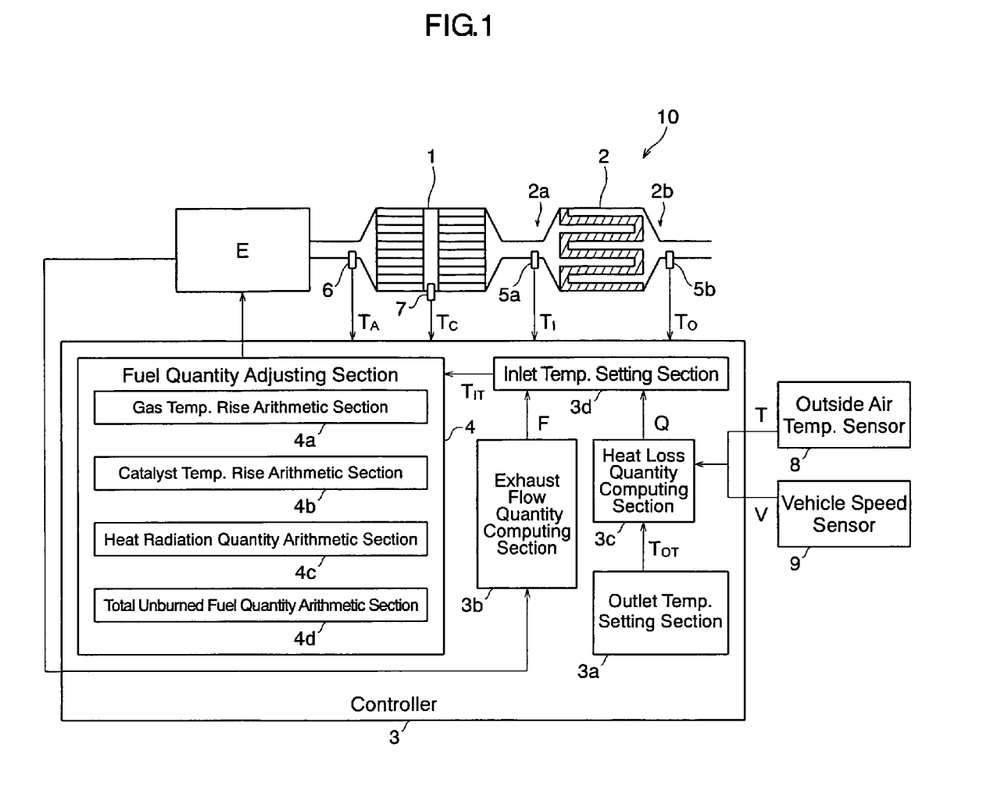
FIG. 1 is a schematic block diagram showing a configuration of an exhaust purification system according to the present invention.

An engine E shown in FIG. 1 is a diesel engine using gas oil as fuel. In an exhaust passageway 10 from this engine E, a diesel oxidation catalyst (DOC) 1 and a diesel particulate filter (DPF) 2 are arranged in order from the upstream side of an exhaust path for exhaust gas (exhaust) discharged from the engine E.

The oxidation catalyst 1 oxidize nitrogen oxide (NO) contained in exhaust gas to generate nitrogen dioxide ($NO_2$), and supplies this $NO_2$ to the diesel particulate filter 2. The oxidation catalyst 1 also has a function of generating heat of oxidation by oxidizing unburned fuel (HC) contained in exhaust gas, and raising the temperature of the exhaust gas.

The filter 2 is a porous filter (e.g., a ceramic filter) that collects particulate matter (PM mainly composed of carbon C) contained in exhaust gas which causes black smoke. As schematically shown in FIG. 1, the interior of the filter 2 is divided into several parts by a wall body along the flowing direction of the exhaust gas, and when the exhaust gas passes through this wall body, PM is collected into the wall body, whereby the exhaust gas is purified (or filtered).

On the filter 2, by using $NO_2$ supplied from the oxidation catalyst 1 as an oxidizing agent, the collected PM is to be burned under a predetermined temperature condition. In this manner, the PM accumulated within the wall body of the filter 2 is removed, so that the filter 2 is regenerated and purified.

Within the oxidation catalyst 1, there is provided a catalytic temperature sensor (catalytic temperature detecting device) 7 that detects a catalytic temperature $T_C$. Upstream of the oxidation catalyst 1, there is provided a catalyst inlet temperature sensor (catalyst inlet temperature detecting device) 6 that detects an exhaust gas temperature (catalyst inlet exhaust temperature) $T_A$ before flowing into the oxidation catalyst 1, and before and after the filter 2, there are respectively provided an inlet temperature sensor (inlet temperature detecting device) 5a and outlet temperature sensor (outlet temperature detecting device) 5b for detecting the exhaust gas temperatures $T_I$ and $T_O$ on the inlet sides 2a and outlet side 2b of the filter 2. The information on the temperatures $T_C$, $T_A$, $T_I$, and $T_O$ of the catalyst and exhaust gas actually measured by these sensors is input to a controller 3 described later.

Note that a sensor (not shown) for detecting a fuel injection quantity is provided in the Engine E. In addition, there is provided an outside air temperature sensor (outside air temperature detecting device) 8 that detects a temperature (outside air temperature) T outside the exhaust passageway 10, and a vehicle speed sensor (vehicle speed detecting device) 9 that detects a travel speed (vehicle speed) V of a vehicle to which the exhaust purification system is applied.

The controller 3, as shown in FIG. 1, includes five major control sections, which are an outlet temperature setting section (outlet temperature setting device) 3a, an exhaust flow quantity computing section (exhaust flow quantity computing device) 3b, a heat loss quantity computing section (heat loss quantity computing device) 3c, an inlet temperature setting section (inlet temperature setting device) 3d, and a fuel quantity adjusting section (fuel quantity adjusting device) 4. The controller 3 is an electronic control unit for controlling a fuel injection quantity, etc., in the engine E. The controller 3 controls a HC quantity in the exhaust gas, based on the detection information obtained in the above-mentioned catalytic temperature sensor 7, inlet temperature sensor 5a, outlet temperature sensor 5b, catalyst inlet temperature sensor 6, outside air temperature sensor 8, and vehicle speed sensor 9 and on a fuel injection quantity into the engine E, and carries out regeneration control (forced regeneration) of forcibly regenerating and purifying the filter 2.

(2) Configuration of Controller 3

Figure 2:
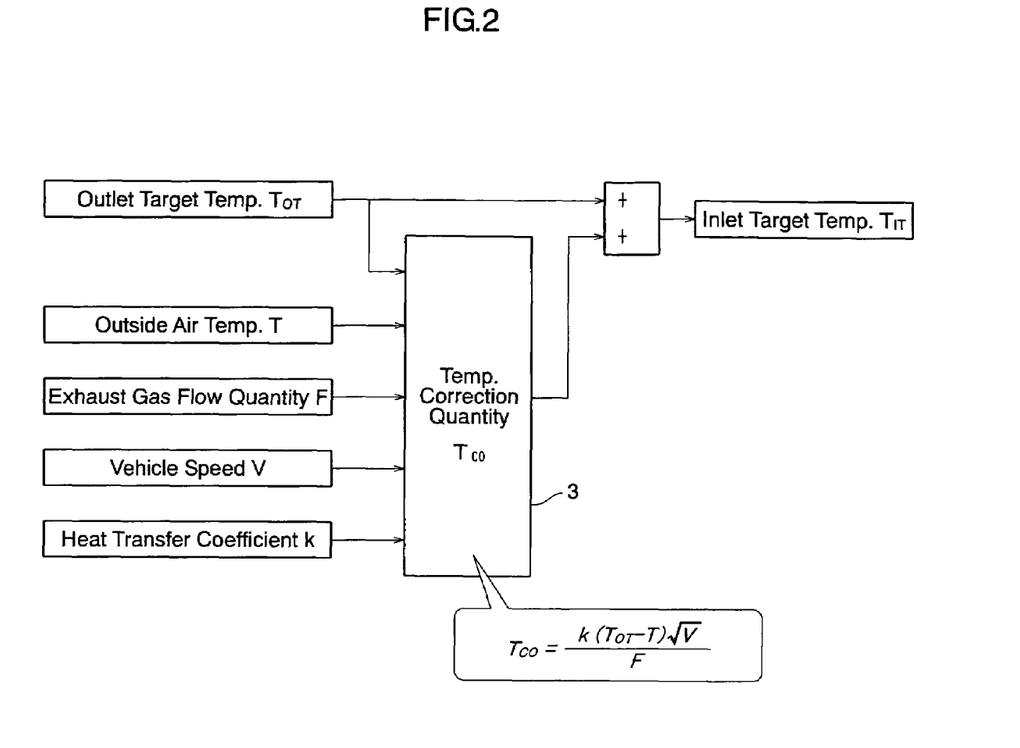
FIG. 2 is a block diagram showing control which is performed in the controller of the exhaust purification system.

The controller 3, as shown in FIG. 2, sets a target value for the exhaust temperature on the downstream side of the filter 2, and performs an arithmetic operation on this target value, taking an outside air temperature T, an exhaust gas flow quantity F, and a vehicle speed V into consideration, and sets the target temperature $T_{IT}$ on the upstream side of the filter 2. The function in each control section of the controller 3 will hereinafter be described in detail.

The outlet temperature setting section 3a sets as an outlet target temperature $T_{OT}$ the target value of the exhaust temperature which is detected on the downstream side of the filter 2 in the exhaust passageway 10. The outlet target temperature $T_{OT}$ is set to a temperature at which PM can burn sufficiently (e.g., complete combustion) at the outlet side 2b of the filter 2, in a range where there is no melt damage to the filter 2. In the embodiment, the outlet target temperature $T_{OT}$ is a fixed temperature (e.g., 650° C.). The outlet target temperature $T_{OT}$ set here is input to the heat loss quantity computing section 3c.

The exhaust flow quantity computing section 3b computes a flow quantity F of the exhaust gas based on a fuel injection quantity to the engine E. Note that, instead of computations based on a fuel injection quantity, by providing a sensor for directly detecting an intake quantity to the engine E, a flow quantity F of the exhaust gas may be computed based on the intake quantity. The flow quantity F of the exhaust gas computed here is input to the inlet temperature setting section 3d.

The heat loss quantity computing section 3c computes a heat loss quantity Q that is radiated outside the exhaust passageway 10 from the filter 2 when the exhaust gas from the engine E passes through the filter 2. In the section 3c, according to the following Eq. (1), the heat loss quantity Q is computed based on the outlet target temperature $T_{OT}$ set in the outlet temperature setting section 3a, the outside air temperature T detected in the outside air temperature sensor 8, and the vehicle speed V detected in the vehicle speed sensor 9. The heat loss quantity Q computed here is input to the inlet temperature setting section 3d.

$$Q = k \cdot (T_{OT} - T) \cdot \sqrt{V} \qquad (1)$$

in which
- k=heat transfer coefficient between the filter 2 and the outside air (outside the exhaust passageway 10),
- $T_{OT}$=outlet target temperature,
- T=outside air temperature,
- V=vehicle speed.

The heat loss quantity Q does not include a heat quantity that transfers from the filter 2 to the exhaust gas, but means a heat quantity which transfers from inside the filter 2 through the outside case of the filter 2 and to outside the exhaust passageway 10 (i.e., the outside air) and is lost as it is.

The inlet temperature setting section 3d sets a temperature in which a loss temperature $T_{CO}$ reduced by the heat loss quantity Q is added to the outlet target temperature $T_{OT}$, as the inlet target temperature $T_{IT}$ on the upstream side of the filter 2. That is, a reduction quantity $T_{CO}$ in the temperature of the exhaust gas between the inlet side 2a and outlet side 2b of the filter 2 is considered to be the heat loss quantity Q radiated outside the filter 2, and according to the following Eqs. (2) and (3), the loss temperature $T_{CO}$ and inlet target temperature $T_{IT}$ are computed. The inlet target temperature $T_{IT}$ set here is input to the fuel quantity adjusting section 4.

$$T_{IT} = T_{OT} + T_{CO} \qquad (2)$$

$$T_{CO} = Q \cdot 1/F = k \cdot (T_{OT} - T) \cdot \sqrt{V} \cdot 1/F \qquad (3)$$

(3) Configuration of Fuel Quantity Adjusting Section 4

Figure 3:
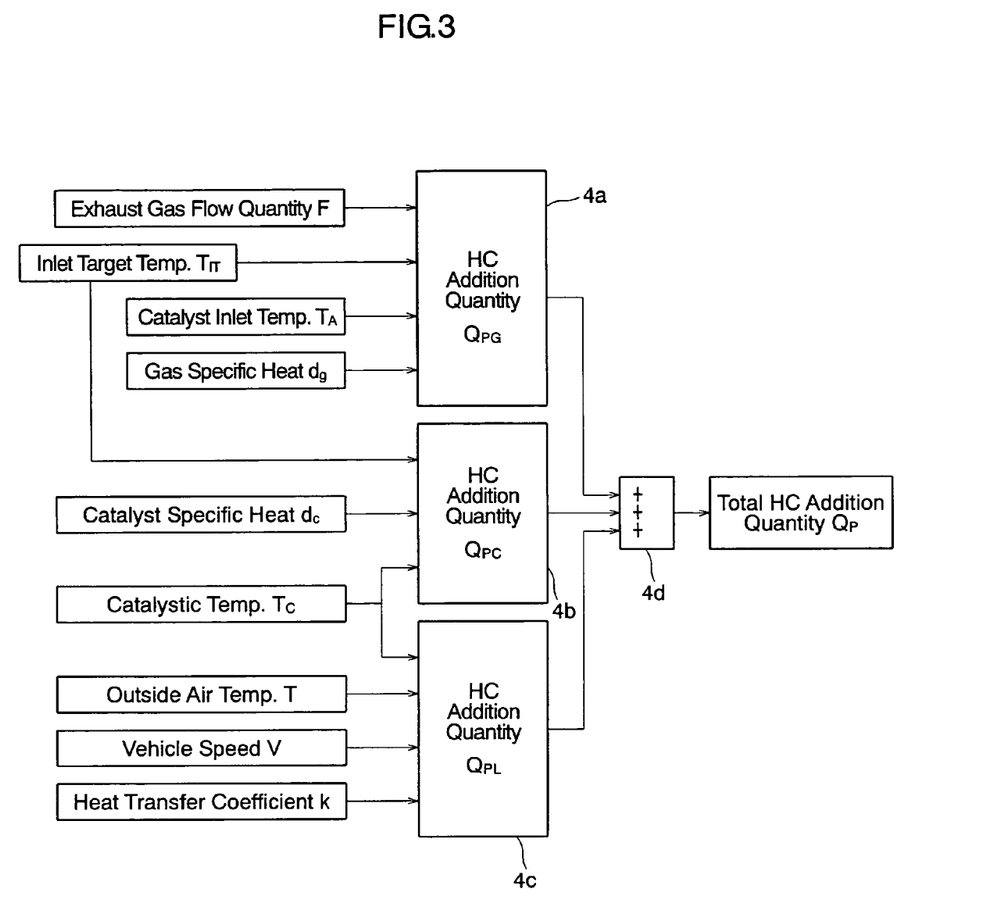
FIG. 3 is a block diagram showing control which is performed in the fuel quantity adjusting section of the exhaust purification system.

The controller 3, as shown in FIG. 3, also adjusts the supply quantity of unburned fuel which is supplied to the oxidation catalyst 1 so that the target temperature $T_{OT}$ on the downstream side of the filter 2 that has been set is obtained. Specifically, the fuel quantity adjusting section 4 adjusts the supply quantity, or the addition quantity, of fuel into the exhaust gas discharged from the engine E so that the exhaust temperature $T_I$ on the inlet side 2a of the filter 2 becomes equal to the inlet target temperature $T_{IT}$. This fuel quantity adjusting section 4 contains, as control sections, a gas temperature rise arithmetic section (gas temperature rise arithmetic device) 4a, a catalytic temperature rise arithmetic section (catalyst temperature rise arithmetic device) 4b, a heat radiation quantity arithmetic section (heat radiation quantity arithmetic device) 4c, and a total unburned fuel quantity arithmetic section (total unburned fuel quantity arithmetic device) 4d.

Methods of fuel supply and addition, which are employed in the fuel quantity adjusting section 4, are arbitrary. Examples of the methods are a method of injecting fuel into the cylinder of the engine E, a method of injecting fuel into the exhaust passageway 10, a method of supplying fuel directly to the oxidation catalyst 1, and so on.

Figure 4A:
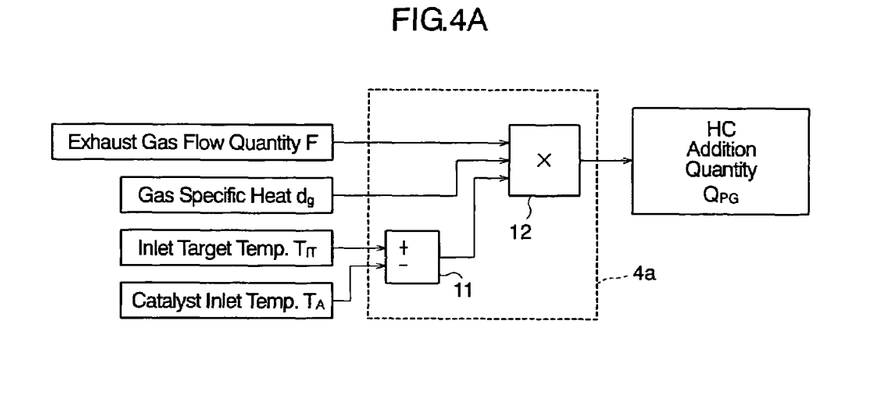
FIG. 4A is an arithmetic block diagram showing arithmetic operations which are performed in the gas temperature rise arithmetic section of the fuel quantity adjusting section of the exhaust purification system.

The gas temperature rise arithmetic section 4a calculates as a first unburned fuel quantity an HC addition quantity $Q_{PG}$ required to raise the temperature $T_I$ of the exhaust gas to the inlet target temperature $T_{IT}$, based on the specific heat (preset constant) $d_g$ of the exhaust discharged from the engine E and on the flow quantity F of the exhaust, the inlet target temperature $T_{IT}$, and the exhaust gas temperature $T_A$ before flowing into the oxidation catalyst 1. That is, in the gas temperature rise arithmetic section 4a, the first unburned fuel quantity required for a rise in temperature of the exhaust gas is calculated.

As shown in FIG. 4A, the gas temperature rise arithmetic section 4a contains a subtracter 11 which computes a difference in temperature between the exhaust gas temperature $T_A$ on the inlet side of the oxidation catalyst 1 and the inlet target temperature $T_{IT}$, and a multiplier 12 which multiples the temperature difference computed in the subtracter 11, the specific heat $d_g$ of the exhaust, and the flow quantity F of the exhaust. With this configuration, the HC addition quantity $Q_{PG}$ is output from the multiplier 12. The arithmetic operation performed here is expressed by the following Eq. (4):

$$Q_{PG} = d_g F(T_{IT} - T_A) \qquad (4)$$

in which
- $d_g$=specific heat of the exhaust.

Figure 4B:
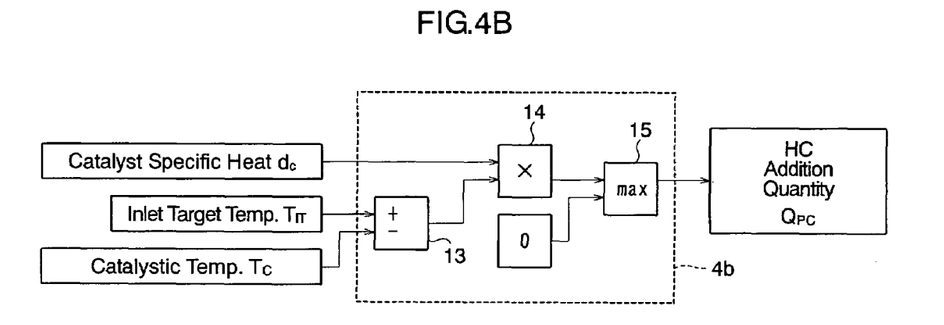
FIG. 4B is an arithmetic block diagram showing arithmetic operations which are performed in the catalyst temperature rise arithmetic section of the fuel quantity adjusting section of the exhaust purification system.

The catalyst temperature rise arithmetic section 4b calculates as a second unburned fuel quantity an HC addition quantity $Q_{PC}$ required to raise the oxidation catalyst 1 up to the inlet target temperature $T_{IT}$, based on the specific heat (preset constant) $d_c$ of the oxidation catalyst 1 and on the inlet target temperature $T_{IT}$ and catalytic temperature $T_C$. That is, in the catalyst temperature rise arithmetic section 4b, the second unburned fuel quantity required for a rise in temperature of the oxidation catalyst 1 is calculated.

As shown in FIG. 4B, the catalyst temperature rise arithmetic section 4b contains a subtracter 13 which computes a difference in temperature between the catalytic temperature $T_C$ and the inlet target temperature $T_{IT}$; a multiplier 14 which multiples the temperature difference computed in the subtracter 13 and the specific heat $d_c$ of the oxidation catalyst 1; and a limiter section 15 which eliminates a negative range from the result of the arithmetic operation in the multiplier 14. With this configuration, if the result of the arithmetic operation in the multiplier 14 is positive, the HC addition quantity $Q_{PC}$ is output from the limiter section 15. Further, if the result of the arithmetic operation in the multiplier 14 is negative, the HC addition quantity $Q_{PC}$ is output as 0. The arithmetic operation performed here is expressed by the following Eq. (5):

$$Q_{PC} = d_c(T_{IT} - T_C) \qquad (5)$$

in which
- $Q_{PC} \geqq 0$,
- $d_c$=specific heat of the oxidation catalyst 1.

Figure 4C:
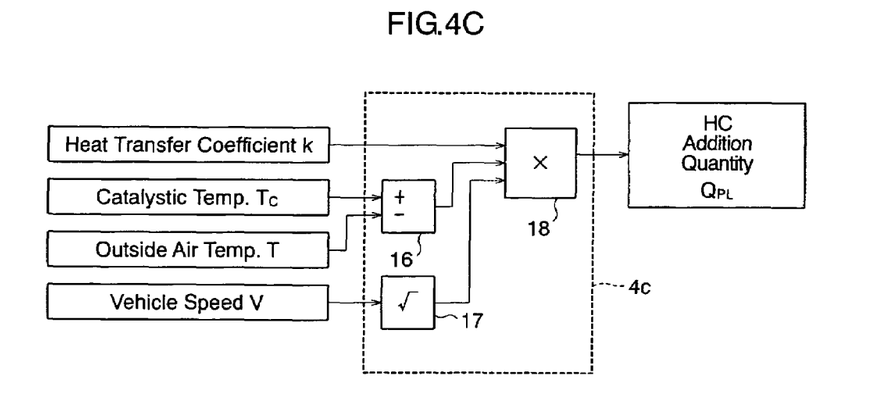
FIG. 4C is an arithmetic block diagram showing arithmetic operations which are performed in the gas heat radiation quantity arithmetic section of the fuel quantity adjusting section of the exhaust purification system.

The heat radiation quantity arithmetic section 4c calculates as a third unburned fuel quantity an HC addition quantity $Q_{PL}$ equivalent to the heat quantity radiated from the oxidation catalyst 1 to the outside air, based on the heat transfer coefficient (a heat transfer rate) k (as previously described, a preset constant) of the oxidation catalyst 1 to the outside air, and on the catalytic temperature $T_C$, outside air temperature T, and vehicle speed V. That is, in the heat radiation quantity arithmetic section 4c, the third unburned fuel quantity required to compensate for the heat quantity lost due to heat radiation is calculated.

As shown in FIG. 4C, the heat radiation quantity arithmetic section 4c contains a subtracter 16 which computes a difference in temperature between the catalytic temperature $T_C$ and the outside air temperature T; a square root arithmetic section 17 which calculates the square root of the vehicle speed V; and a multiplier 18 which multiples the temperature difference computed in the subtracter 16, the square root of the vehicle speed V calculated in the square root arithmetic section 17, and the heat transfer coefficient k of the oxidation catalyst 1 to the outside air. With this configuration, the HC addition quantity $Q_{PL}$ is output from the multiplier 18. The arithmetic operation performed here is expressed by the following Eq. (6):

$$Q_{PL} = k(T_C - T)\sqrt{V} \qquad (6)$$

In the total unburned fuel quantity arithmetic section 4d, as shown in FIG. 3, if the HC addition quantities $Q_{PG}$, $Q_{PC}$, and $Q_{PL}$ are calculated in the above-described arithmetic sections 4a to 4c, the injection of fuel in the engine E is controlled so that the total HC of these quantities $Q_{PG}$, $Q_{PC}$, and $Q_{PL}$ is supplied to the oxidation catalyst 1. Therefore, an unburned fuel quantity in the exhaust is adjusted so that the exhaust gas temperature $T_I$ on the upstream side of the filter 2 becomes the inlet target temperature $T_{IT}$, and the unburned fuel quantity of the sum of the HC addition quantities $Q_{PG}$, $Q_{PC}$, and $Q_{PL}$ is supplied to the oxidation catalyst 1.

That is, the total HC addition quantity $Q_P$ according to actual control is expressed by the following Eq. (7):

$$Q_P = Q_{PG} + Q_{PC} + Q_{PL} \qquad (7)$$

The controller 3 also performs feedback control of the HC addition quantities, based on the exhaust gas temperature $T_I$ on the upstream side of the filter 2 that is input from the inlet temperature sensor 5a. This makes it possible for the exhaust gas temperature $T_I$ on the inlet side of the filter 2 to approach the inlet target temperature $T_{IT}$ in a short time and accurately.

(4) End Judgment of Forced Regeneration Control

Although a detailed description is not given here, the controller 3 judges whether the filter 2 requires regeneration and purification, using a well-known method, and starts the above-mentioned forced regeneration control. The end condition of the forced regeneration control is judged based on the exhaust gas temperature $T_O$ on the downstream side of the filter 2 that is input from the outlet temperature sensor 5b.

Specifically, when a predetermined period of time has passed since the exhaust gas temperature $T_O$ on the downstream side of the filter 2 became equal to the outlet target temperature $T_{OT}$ set in the outlet temperature setting section 3a (or since the exhaust gas temperature $T_O$ exceeded the outlet target temperature $T_{OT}$), control of the HC quantities is stopped, whereby regeneration control is ended. That is, if the overall temperature of the filter 2 is higher than the outlet target temperature $T_{OT}$, the combustion efficiency in the filter 2 is sufficiently assured. Therefore, in the preferred embodiment, a judgment for ending control is performed based on the time when has elapsed since the exhaust gas temperature $T_O$ on the downstream side of the filter 2 became equal to the outlet target temperature $T_{OT}$.

[Function]

The exhaust purification system of the embodiment is configured as described above and works as follows.

(1) Setting of Inlet Target Temperature $T_{IT}$

First, in the outlet temperature setting section 3a, a target value of the exhaust temperature on the downstream side of the filter 2 in the exhaust passageway 10 is set as the outlet target temperature $T_{OT}$. Subsequently, the outside air temperature T and vehicle speed V are detected in the outside air temperature sensor 8 and vehicle speed sensor 9, and are input to the controller 3. Next, in the heat loss quantity computing section 3c, the heat loss quantity Q that is radiated from the filter 2 to outside the exhaust passageway 10 is computed based on the above-described Eq. (1). On the other hand, in the exhaust flow quantity computing section 3b, the flow quantity F of the exhaust gas is computed based on information on a fuel injection quantity that is input from the engine E.

And in the inlet temperature setting section 3d, the loss temperature $T_{CO}$ of the exhaust gas that diminishes between the inlet side 2a and outlet side 2b of the filter 2 is computed based on the heat loss quantity Q and the flow quantity F of the exhaust gas by the above-described Eq. (3). Based on the above-described Eq. (2), the loss temperature $T_{CO}$ is added to the outlet target temperature $T_{OT}$, whereby the inlet target temperature $T_{IT}$ on the upstream side of the filter 2 is set.

(2) Computation of HC Addition Quantities

If the inlet target temperature $T_{IT}$ is set in the inlet temperature setting section 3d, HC addition quantities are calculated in the fuel quantity adjusting section 4 so that the exhaust temperature $T_I$ on the upstream side of the filter 2 becomes equal to the inlet target temperature $T_{IT}$.

First, in the gas temperature rise arithmetic section 4a, a HC addition quantity $Q_{PG}$ relating to a rise in temperature of the exhaust gas is computed according to the above-described Eq. (4), based on the specific heat $d_g$ of the exhaust discharged from the engine E and on the flow quantity F of the exhaust, the inlet target temperature $T_{IT}$, and the exhaust gas temperature $T_A$ before flowing into the oxidation catalyst 1.

Subsequently, in the catalyst temperature rise arithmetic section 4b, a HC addition quantity $Q_{PC}$ relating to a rise in temperature of the oxidation catalyst 1 is computed according to the above-described Eq. (5), based on the specific heat $d_c$ of the oxidation catalyst 1 and on the inlet target temperature $T_{IT}$ and the catalytic temperature $T_C$.

Furthermore, in the heat radiation quantity arithmetic section 4c, a HC addition quantity $Q_{PL}$ relating to a heat loss quantity radiated from the oxidation catalyst 1 is calculated according to the above-described Eq. (6), based on the heat transfer coefficient k from the oxidation catalyst 1 to the outside air and on the catalytic temperature $T_C$, outside air temperature T, and vehicle speed V.

And in the total unburned fuel quantity arithmetic section 4d, the HC addition quantities calculated in the gas temperature rise arithmetic section 4a, catalyst temperature rise arithmetic section 4b, and heat radiation quantity arithmetic section 4c are added together, whereby the total HC addition quantity $Q_P$ relating to actual control is calculated.

(3) Control Flow

If the total HC addition quantity $Q_P$ is computed as described above, feedback control of the total HC addition quantity $Q_P$ is performed based on the exhaust gas temperature $T_I$ on the upstream side of the filter 2 that is input from the inlet temperature sensor 5a, by the controller 3. Therefore, regeneration control of the filter 2 is performed so that the exhaust gas temperature $T_I$ on the inlet side of the filter 2 approaches the inlet target temperature $T_{IT}$.

Figure 5:
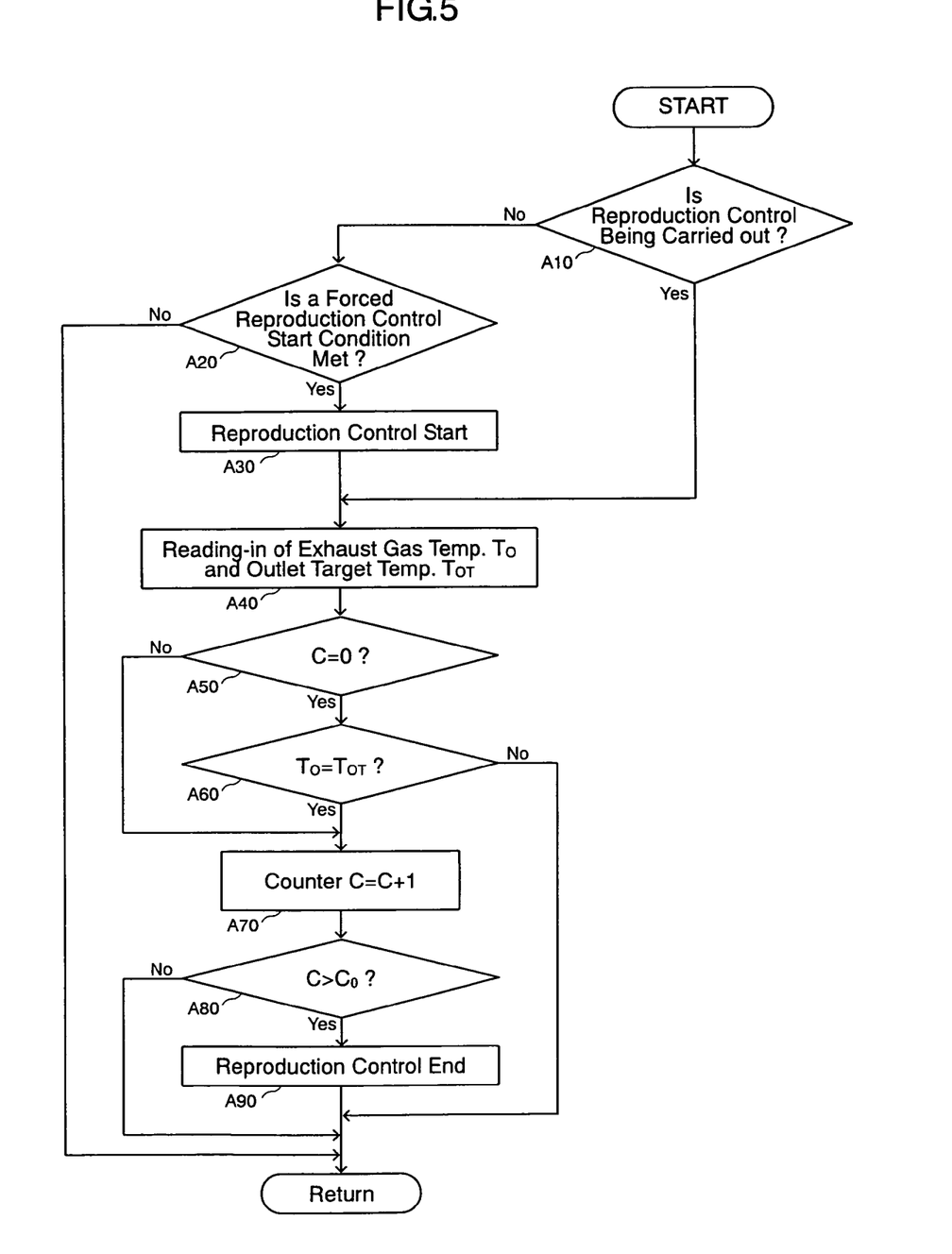
FIG. 5 is a flowchart showing how regeneration control ends by the exhaust purification system according to the present invention.

Next, a flowchart relating to a judgment for ending regeneration control will be described with reference to FIG. 5. This flowchart is repeatedly executed at predetermined periods within the controller 3.

In step A10, it is judged whether regeneration control is being carried out. In the case where regeneration control is being carried out, the regeneration processing advances to step A40. In the case where it is not being carried out, the regeneration processing advances to step A20.

In step A20, it is judged whether a predetermined forced regeneration start condition is met. Although a detailed description is omitted, the forced regeneration start condition is, for example, that (1) after the end of the previous forced regeneration control, the distance traveled by the vehicle is a predetermined distance or greater, (2) after the end of the previous forced regeneration control, the operating time is a predetermined period of time or greater, or (3) a difference in exhaust pressure between the upstream side and downstream side of the filter 2 is a predetermined pressure or greater. That is, the forced regeneration start condition is a condition for judging the state in which the filter 2 is requiring forced regeneration control.

When the forced regeneration start condition is met, the regeneration processing advances to step A30, in which the forced regeneration control is stared, and the regeneration processing further advances to step A40 and subsequent steps. On the other hand, when the forced regeneration start condition is not met, regeneration control is not carried out, and the regeneration processing ends as it is. That is, step A40 and subsequent steps are processed only when the forced regeneration control is carried out.

In step A40, reference is made to both the exhaust gas temperature $T_O$ on the downstream side of the filter 2 detected in the outlet temperature sensor 5$b$ and the outlet target temperature $T_{OT}$ set in the outlet temperature setting section 3$a$. In step A50, it is judged whether a counter C is zero. This counter C is a parameter for measuring the end time of the forced regeneration control, and the initial value is set to C=0. When C=0 the regeneration processing advances to step A60, and when C≠0 the regeneration processing advances to A70.

In step A60, it is judged whether the exhaust gas temperature $T_O$ equals the outlet target temperature $T_{OT}$. When $T_O = T_{OT}$, the regeneration processing advances to step A70. When $T_O \neq T_{OT}$, the regeneration processing ends as it is. In this case, the forced regeneration control is being carried out, but since the temperature on the downstream side of the filter 2 has not risen to its target value, the force regeneration control is continuously carried out so that the temperature of the exhaust gas is sequentially raised.

If the temperature on the downstream side of the filter 2 reaches the target value by regeneration control, the regeneration processing advances to step A70 by a judgment in step A60. Note that the judgment condition in step A60 may be $T_O \geq T_{OT}$.

In step A70, C+1 is substituted for C (C=C+1). That is, the counter C with an initial value of 0 starts to increase when $T_O$ has become equal to $T_{OT}$, and starts to count time. Therefore, once the counter C starts to count time, it continues to count time regardless of the magnitude of the exhaust gas temperature $T_O$ thereafter by the judgment in step A50.

In step A80, it is judged whether the counter C is greater than a preset fixed value $C_O$. When C>$C_O$, the regeneration processing advances to step A90, in which regeneration control ends. In step A80, when C≤$C_O$, the regeneration processing ends as it is.

That is, in step A80, it is judged whether a period of time has passed until the counter C becomes greater than the preset value $C_O$, and the preset value $C_O$ is a value corresponding to a period of time during which regeneration control should continue since the exhaust gas temperature $T_O$ became equal to the outlet target temperature $T_{OT}$.

[Advantages]

According to the exhaust purification system of the embodiment, the following advantages are obtainable.

Figure 6:
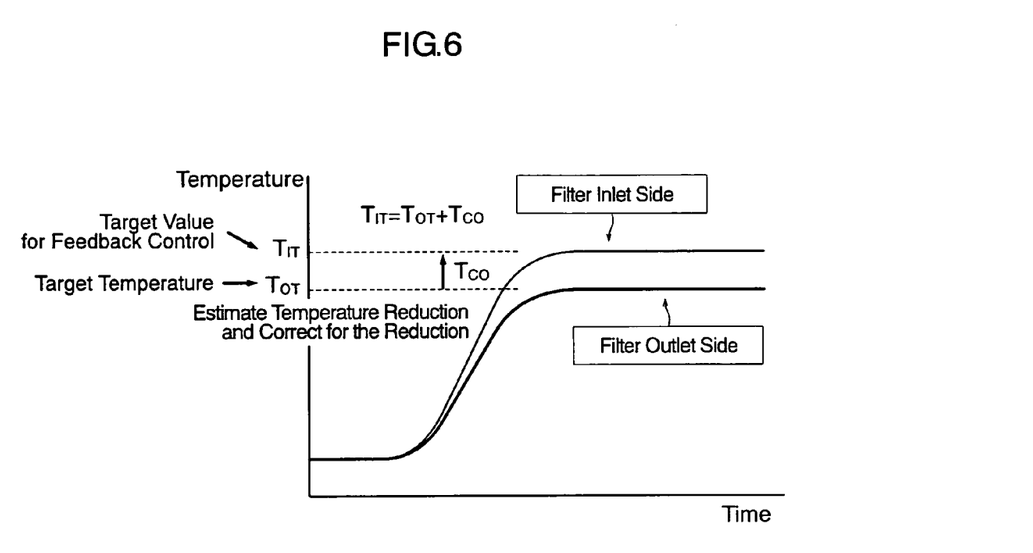
FIG. 6 is a graph showing changes in the inlet and outlet temperatures of the filter of the exhaust purification system of the present invention.

For example, as shown in FIG. 7, compared with the conventional exhaust purification system which controls a HC quantity contained in exhaust gas so that the exhaust gas temperature on the inlet side of the filter 2 reaches 650° C., the exhaust purification system of the present invention controls a HC quantity contained in exhaust gas so that the exhaust gas temperature $T_{OT}$ on the outlet side of the filter 2 reaches 650° C., as shown in FIG. 6. Therefore, the overall temperature of the filter 2 can be made higher than 650° C. That is, the exhaust purification system of the present invention is capable of realizing sufficient regeneration in which the amount of unburned PM is slight between the upstream side and downstream side of the filter 2. In addition, since the amount of unburned PM remaining on the filter 2 after regeneration is slight, an excess rise in temperature can be suppressed during the next forced regeneration, whereby melt damage to the filter 2 can be prevented.

In the exhaust purification system of the present invention, in order to cause the exhaust gas temperature $T_{OT}$ on the outlet side of the filter 2 to be 650° C., a temperature reduction $T_{CO}$ due to heat radiation is estimated and corrected, taking the heat loss quantity Q from the filter 2 to the outside air into consideration. That is, by adding the temperature reduction $T_{CO}$ to the temperature $T_{OT}$ at which PM can burn sufficiently at the outlet side of the filter 2, the exhaust gas temperature $T_{IT}$ on the inlet side of the filter 2 which becomes a target value for regeneration control is set, so that it can be guaranteed that the exhaust gas temperature $T_{OT}$ on the outlet side of the filter 2 becomes 650° C. Note that since the arithmetic operation is based on the heat loss Q, accurate temperature control is possible even when the operating region changes.

By arithmetic operations taking into consideration the transfer of heat transfer from the exhaust passageway 10 which is based on the outside air temperature T, exhaust gas flow quantity F, and vehicle speed V, the heat loss quantity Q can be strictly grasped, whereby the temperature $T_{IT}$ on the inlet side of the filter 2 can be accurately obtained so that the temperature on the outlet side of the filter 2 becomes the outlet target temperature $T_{OT}$.

In regeneration control in which the exhaust gas temperature on the inlet side of the filter 2 is controlled so that it becomes the inlet target temperature $T_{IT}$, a HC quantity in the exhaust gas is adjusted so that the exhaust gas temperature is raised. Therefore, for example, if a fuel injection quantity into the engine E is controlled, HC can be added into the exhaust gas, so a structure for control can be made simpler. That is, the exhaust purification system of the present invention does not require any external heat source such as a heater for a rise in temperature of the exhaust gas and filter 2 and is therefore able to reduce costs.

If regeneration control for the filter 2 is started, a HC addition quantity into the exhaust gas is controlled by actual feedback control based on the exhaust gas temperature $T_I$ on the upstream side of the filter 2, so that the exhaust gas temperature $T_I$ on the inlet side of the filter 2 can approach the inlet target temperature $T_{IT}$ in a short time and accurately. In addition, following a control flow as shown in FIG. 5, the state of regeneration on the filter 2 can be accurately estimated and grasped by counting the time C that has passed since the time that regeneration was efficiently performed. That is, compared with the case where regeneration is performed slowly at low temperature, regeneration can be finished in a short time, so that the entire regeneration time can be shortened. This can improve vehicle's fuel consumption.

In arithmetic operations for adjusting a HC addition quantity, the heat transfer between the exhaust gas, the oxidation catalyst 1, and the outside air can be accurately grasped, so the total HC addition quantity $Q_p$ required to obtain the inlet target temperature $T_{IT}$ can be accurately computed. That is, regeneration control for the filter 2 can be accurately carried out, even in a state where arithmetic conditions are different like the outside air temperature T, the temperature $T_C$ of the oxidation catalyst 1, the travel state of the vehicle, etc., or even in a transient state where arithmetic conditions vary with disturbance (noise) such as acceleration and deceleration.

In arithmetic operations for the HC addition quantity, the constant parameters preset in the fuel quantity adjusting section 4 are only three kinds: the specific heat $d_g$ of the exhaust; the specific heat $d_c$ of the oxidation catalyst 1; and the heat transfer coefficient k from the oxidation catalyst 1 to the outside air. That is, if heat transfer is taken into account, the HC addition quantity can be accurately calculated without preparing parameters, such as engine speed and engine torque, and a corresponding map for these parameters. Thus, the preparation step can be saved.

Other Embodiments

While the present invention has been described with reference to the embodiment thereof, the invention is not to be limited to the details given herein, but may be modified within the scope of the invention hereinafter claimed.

For example, in the above-mentioned embodiment, in the controller 3 the feedback control for the HC addition quantity is performed based on the exhaust gas temperature $T_I$ on the upstream side of the filter 2, but this feedback control is dispensable. Therefore, when the feedback control is not performed, the inlet temperature sensor 5a can be removed from the exhaust purification system of the present invention.

Similarly, the judgment for ending regeneration control may be made by methods other than the above-described method. For instance, an exhaust gas temperature on the upstream side of the filter 2 which can be estimated so that the exhaust gas temperature $T_O$ on the downstream side of the filter 2 becomes equal to the outlet target temperature $T_{OT}$ set in the outlet temperature setting section 3a, is grasped as an end judgment temperature beforehand by experiment, etc., and the counter is set so that it starts to count time when the exhaust gas temperature $T_I$ on the upstream side of the filter 2 input from the inlet temperature sensor 5a has become equal to (or exceeded) this end judgment temperature. In this case, the outlet temperature sensor 5b can be removed from the exhaust purification system of the present invention.

In the above-mentioned embodiment, the target value (outlet target temperature $T_{OT}$) of the exhaust temperature on the downstream side of the filter 2 is set as a preset fixed value (650° C.), but it may be changed and set according to various conditions such as the running state of the engine E, travel state of the vehicle, outside air temperature, etc. In this case, fine temperature control becomes possible according to various conditions, whereby the regeneration efficiency can be further improved.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An exhaust purification system, comprising:
   an oxidation catalyst disposed in an exhaust passageway of an engine;
   a filter disposed downstream of said oxidation catalyst in said exhaust passageway;
   an outlet temperature setting device for setting, as an outlet target temperature, a target value for an exhaust temperature, the outlet target temperature being a predetermined temperature at which particulate matter is burned at an outlet side of the filter;
   a heat loss quantity computing device for computing a heat loss quantity radiated from said filter to outside said exhaust passageway when exhaust discharged from said engine passes through said filter; and
   an inlet temperature setting device for setting, as an inlet target temperature on an upstream side of said filter, the inlet target temperature being obtained by adding a loss temperature reduced by said heat loss quantity to said outlet target temperature;
   an outside air temperature detecting device for detecting a temperature outside said exhaust passageway as an outside air temperature;
   an exhaust flow quantity computing device for detecting or computing a flow quantity of said exhaust discharged from said engine; and
   a vehicle speed detecting device for detecting a travel speed of said vehicle,
   wherein said heat loss quantity computing device computes said heat loss quantity based on said outside air temperature, said exhaust flow quantity, and said travel speed.

2. The exhaust purification system as set forth in claim 1, further comprising:
   a fuel quantity adjusting device for adjusting a supply quantity of unburned fuel that is supplied to said oxidation catalyst so that an exhaust temperature on the upstream side of said filter becomes said inlet target temperature.

3. The exhaust purification system as set forth in claim 2, further comprising:
   an inlet temperature detecting device for detecting an exhaust temperature on an inlet side of said filter in said exhaust passageway,
   wherein said fuel quantity adjusting device adjusts said supply quantity of unburned fuel by feedback control that is based on said exhaust temperature on said inlet side detected by said inlet temperature detecting device.

4. The exhaust purification system as set forth in claim 3, further comprising:
   an outlet temperature detecting device for detecting an exhaust temperature on an outlet side of said filter in said exhaust passageway,
   wherein said fuel quantity adjusting device stops supply of said unburned fuel when a predetermined period of time has passed since said exhaust temperature on said outlet side detected by said outlet temperature detecting device has become equal to said outlet target temperature.

5. The exhaust purification system as set forth in claim 2, wherein said fuel quantity adjusting device stops supply of said unburned fuel when a predetermined period of time has passed since an entire temperature of said filter was equal to or higher than said outlet target temperature.

6. The exhaust purification system as set forth in claim 5, further comprising:
   an outlet temperature detecting device for detecting an exhaust temperature on an outlet side of said filter in said exhaust passageway,
   wherein said fuel quantity adjusting device stops supply of said unburned fuel when a predetermined period of time has passed since said exhaust temperature on said outlet side detected by said outlet temperature detecting device has become equal to said outlet target temperature.

7. The exhaust purification system as set forth in claim 2, further comprising:
   an outlet temperature detecting device for detecting an exhaust temperature on an outlet side of said filter in said exhaust passageway,
   wherein said fuel quantity adjusting device stops supply of said unburned fuel when a predetermined period of time has passed since said exhaust temperature on said outlet side detected by said outlet temperature detecting device became equal to said outlet target temperature.

8. The exhaust purification system as set forth in claim 2, further comprising:
   a catalytic temperature detecting device for detecting a temperature of said oxidation catalyst; and a catalyst inlet temperature detecting device for detecting, as a catalyst inlet exhaust temperature, a temperature of exhaust before it flows into said oxidation catalyst;

wherein said fuel quantity adjusting device has:
- (A) a gas temperature rise arithmetic device for calculating a first unburned fuel quantity required to raise said exhaust on the upstream side of said filter up to said inlet target temperature, based on a specific heat of said exhaust discharged from said engine, said exhaust flow quantity, said inlet target temperature, and said catalyst inlet exhaust temperature;
- (B) a catalyst temperature rise arithmetic device for calculating a second unburned fuel quantity required to raise said oxidation catalyst up to said inlet target temperature, based on a specific heat of said oxidation catalyst, said inlet target temperature, and said oxidation catalyst temperature;
- (C) a heat radiation quantity arithmetic device for calculating a third unburned fuel quantity equivalent to a heat quantity radiated from said oxidation catalyst to outside said exhaust passageway, based on a heat transfer rate from said oxidation catalyst to outside said exhaust passageway, said oxidation catalyst temperature, said outside air temperature, and said travel speed; and
- (D) a total unburned fuel quantity arithmetic device for summing said first unburned fuel quantity, said second unburned fuel quantity, and said third unburned fuel quantity to calculate a total unburned fuel quantity, and adjusting said supply quantity of unburned fuel supplied to said oxidation catalyst to said total unburned fuel quantity.

* * * * *